US011838240B2

(12) United States Patent
Gerstenberger et al.

(10) Patent No.: US 11,838,240 B2
(45) Date of Patent: *Dec. 5, 2023

(54) UPLINK CONTROL INFORMATION (UCI) MAPPING INDICATOR FOR LONG TERM EVOLUTION (LTE) CARRIER AGGREGATION

(71) Applicant: TELEFONAKTIEBOLAGET LM ERICSSON (PUBL), Stockholm (SE)

(72) Inventors: Dirk Gerstenberger, Stockholm (SE); Daniel Larsson, Lund (SE); David Hammarwall, Vallentuna (SE); Robert Baldemair, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 52 days.

This patent is subject to a terminal disclaimer.

(21) Appl. No.: 17/329,589

(22) Filed: May 25, 2021

(65) Prior Publication Data

US 2021/0281380 A1     Sep. 9, 2021

Related U.S. Application Data

(63) Continuation of application No. 16/197,035, filed on Nov. 20, 2018, now Pat. No. 11,018,833, which is a
(Continued)

(51) Int. Cl.
H04L 5/00       (2006.01)
H04W 72/21      (2023.01)

(52) U.S. Cl.
CPC .......... H04L 5/0055 (2013.01); H04L 5/001 (2013.01); H04L 5/006 (2013.01); H04L 5/0057 (2013.01);
(Continued)

(58) Field of Classification Search
None
See application file for complete search history.

(56) References Cited

U.S. PATENT DOCUMENTS 8,514,796 B2 * 8/2013 Kowalski .............. H04L 1/0067
370/308
10,135,595 B2    11/2018 Gerstenberger
(Continued)

FOREIGN PATENT DOCUMENTS

RU    2344548 C2     3/2008
WO    2010073829 A1  7/2010
WO    2011153706 A1  12/2011

OTHER PUBLICATIONS

3GPP TS 36.211 v8.9.0; 3rd Generation Partnership Project; Technical Specification Group Radio Access Network; Evolved Universal Terrestrial Radio Access (E-UTRA); Physical Channels and Modulation (Release 8); Dec. 9, 2009.
(Continued)

Primary Examiner — Mariela Vidal Carpio

(57) ABSTRACT

A system and method to instruct a user equipment (UE) how Uplink Control Information (UCI) on a Physical Uplink Shared Channel (PUSCH) should be transmitted with carrier aggregation. A semi-static signaling of a UCI mapping bit (via a Radio Resource Control (RRC) parameter) is used by a base station such as an eNodeB to require the UE to transmit UCI using one of two pre-determined UCI transmission modes. The bit can be decided by the base station, considering, for example, the available bandwidth or quality of different Uplink Component Carriers (UL CCs) associated with the UE. This network-based solution allows the network to either configure a general rule of UCI transmission by the UE or to enforce the UCI transmission on the
(Continued)

Uplink Primary cell (UL Pcell). Because of the rules governing abstracts, this abstract should not be used to construe the claims.

14 Claims, 3 Drawing Sheets

Related U.S. Application Data continuation of application No. 13/163,151, filed on Jun. 17, 2011, now Pat. No. 10,135,595.

(60) Provisional application No. 61/356,856, filed on Jun. 21, 2010.

(52) U.S. Cl.
CPC .......... H04L 5/0064 (2013.01); H04L 5/0094 (2013.01); H04W 72/21 (2023.01); *H04L 5/0007* (2013.01)

(56) References Cited

U.S. PATENT DOCUMENTS

| | | | | |
|---|---|---|---|---|
| 2010/0067472 | A1* | 3/2010 | Ball | H04L 5/0053 370/329 |
| 2010/0098012 | A1* | 4/2010 | Bala | H04L 1/1812 370/329 |
| 2010/0118773 | A1* | 5/2010 | Kawamura | H04L 1/1692 370/328 |
| 2010/0130218 | A1* | 5/2010 | Zhang | H04W 48/12 455/458 |
| 2010/0195575 | A1* | 8/2010 | Papasakellariou | H04L 5/0055 370/328 |
| 2010/0271970 | A1* | 10/2010 | Pan | H04L 1/0026 370/252 |
| 2010/0278109 | A1* | 11/2010 | Papasakellariou | H04L 5/0037 370/328 |
| 2011/0014928 | A1 | 1/2011 | Ruckart et al. | |
| 2011/0038271 | A1* | 2/2011 | Shin | H04W 52/242 370/252 |
| 2011/0141928 | A1* | 6/2011 | Shin | H04L 1/1861 370/252 |
| 2011/0216733 | A1* | 9/2011 | Han | H04L 5/003 370/329 |
| 2011/0228877 | A1* | 9/2011 | Han | H04L 5/0007 375/295 |
| 2011/0249578 | A1* | 10/2011 | Nayeb Nazar | H04L 5/0053 370/252 |
| 2011/0268045 | A1* | 11/2011 | Heo | H04L 1/0029 370/329 |
| 2011/0274043 | A1* | 11/2011 | Nam | H04W 72/1289 370/328 |
| 2011/0280203 | A1* | 11/2011 | Han | H04L 5/0026 370/329 |
| 2011/0317577 | A1* | 12/2011 | Yamada | H04W 24/10 370/252 |
| 2012/0113831 | A1* | 5/2012 | Pelletier | H04L 5/0053 370/252 |
| 2013/0022007 | A1* | 1/2013 | Berggren | H04L 5/0053 370/329 |
| 2013/0114472 | A1* | 5/2013 | Tamaki | H04W 72/0406 370/280 |
| 2013/0121280 | A1* | 5/2013 | Ouchi | H04W 72/042 370/329 |
| 2013/0153298 | A1* | 6/2013 | Pietraski | H04W 16/08 175/45 |
| 2013/0176957 | A1* | 7/2013 | Gao | H04L 5/0007 370/329 |
| 2017/0111899 | A1* | 4/2017 | Pan | H04L 1/0029 |

OTHER PUBLICATIONS

3GPP TS 36.213 v9.2.0; Technical Specification Group Radio Access Network; Evolved Universal Terrestrial Radio Access (E-UTRA); Physical layer Procedures (Release 9); Jun. 2010.

3GPP TS 36.331 v9.3.0; Technical Specification Group Radio Access Network; Evolved Universal Terrestrial Radio Access (E-UTRA); Radio Resource Control (RRC); Protocol specification (Release 9); Jun. 17, 2010.

Ericsson, et al., "UCI on PUSCH", R1-105320, 3GPP draft; 3rd Generation Partnership Project (3GPP RAN WG1); Oct. 14, 2010.

Ericsson, et al., R1-101731, "Evaluation of PUCCH Proposals for Carrier Aggregration" 3GPP draft; 3rd Generation Partnership Project (3GPP RAN WG1); Apr. 6, 2010.

Huawei, "CQI/PMI/RI reporting for carrier aggregation", R1-103090, 3GPP TSG RAN WG1 #61, May 10-14, 2010.

Nokia Siemens, et al., "UL control signalling to support bandwidth extension in LTE—Advanced", R1-090234, 3GPP TSG RAN WG1 #55bis, Jan. 12-16, 2009.

Qualcomm Incorporated, "UCI Transmission for CA", R1-102746, 3GPP TSG RAN WG1 #61, May 10-14, 2010.

Samsung, "Concurrent PUSCH and PUCCH Transmissions", R1-091878, 3GPP TSG RAN WG1 #57, May 4-8, 2009.

Samsung, "Concurrent PUSCH and PUCCH Transmissions", R1-102175, 3GPP TSG RAN WG1 #60bis, Apr. 12-16, 2010.

* cited by examiner

UPLINK CONTROL INFORMATION (UCI) MAPPING INDICATOR FOR LONG TERM EVOLUTION (LTE) CARRIER AGGREGATION

CROSS-REFERENCE TO RELATED APPLICATIONS

This application is a continuation application of U.S. patent application Ser. No. 16/197,035, filed Nov. 20, 2018, granted as U.S. Pat. No. 11,018,833 on May 25, 2021, which is a continuation application of U.S. patent application Ser. No. 13/163,151, filed Jun. 17, 2011, granted as U.S. Pat. No. 10,135,595 on Nov. 20, 2018 and entitled "UPLINK CONTROL INFORMATION (UCI) MAPPING INDICATOR FOR LONG TERM EVOLUTION (LTE) CARRIER AGGREGATION," which claims the priority benefit under 35 U.S.C. § 119(e) of U.S. Provisional Application No. 61/356,856 filed Jun. 21, 2010, the disclosures of which are incorporated herein by reference in their entirety.

BACKGROUND

The present invention relates to transmission of control information in wireless communication systems. More particularly, and not by way of limitation, the present invention is directed to a system and method for controlling transmission of Uplink Control Information (UCI) in a cellular wireless network with Carrier Aggregation (CA).

In a wireless communication system (e.g., a Long Term Evolution (LTE) fourth generation (4G) cellular network), a base station (e.g., an evolved Node-B or eNodeB (eNB) or a similar entity) may communicate with a mobile handset or User Equipment (UE) via uplink (UL) and downlink (DL) signaling over a radio frame. FIG. 1 illustrates an LTE radio frame 10 (Frame N) in a sequence of radio frames (Frames N−1, N, N+1, etc.) that may constitute the communication "link" between a base station and a mobile handset in a cellular network. The radio frame 10 may be of a fixed duration and may be divided into a fixed number of equally-sized subframes 12 identified as subframes "S0" through "S9" in FIG. 1. For example, in case of an LTE network, each radio frame 10 (i.e., each of Frame N, Frame N+1, etc.) may be of 10 ms duration, and may contain 10 subframes of 1 ms each as shown in FIG. 1. The frequency bandwidth of the radio frame 10 may depend on the overall system bandwidth available in the carrier network. Each subframe 12 in the radio frame 10 can be allocated as a DL subframe, as a UL subframe, or as a special subframe which consists of the Downlink Pilot Time Slot (DwPTS), Guard Period (GP) and Uplink Pilot Time Slot (UpPTS) fields (not shown). The GP field in the special subframe enables switching between downlink and uplink transmissions in a TDD system. Each subframe 12 contains information in the time domain as well as in the frequency domain (involving different sub-carriers).

A base station may transmit wireless channel resource allocation information to a mobile handset, terminal or User Equipment (UE) via a downlink control signal, such as the Physical Downlink Control Channel (PDCCH) signal in Third Generation Partnership Project (3GPP) 3G and 4G networks. Modern cellular networks (e.g., LTE) use Hybrid Automatic Repeat Request (HARQ) in which, after receiving this PDCCH downlink transmission (i.e., transmission from a base station to a mobile device) in a subframe, the UE may attempt to decode it and report to the base station whether the decoding was successful (ACK or Acknowledge) or not (NACK or Negative Acknowledge). In case of an unsuccessful decoding attempt, the base station can retransmit the erroneous data.

Such reporting may be performed by the UE using uplink control signaling (i.e., transmission from a mobile device to a base station in a cellular network), which can include one or more of the following: (i) Hybrid-ARQ (HARQ) acknowledgements (ACK/NACK) for received downlink data (from the base station); (ii) terminal reports (e.g., in the form of one or more Channel Quality Indicator (CQI) bits) related to the downlink channel conditions. Such reports may be used by the base station to assist it in future downlink scheduling of the mobile handset; and (iii) scheduling requests by the UE, indicating that the mobile terminal or UE needs uplink resources for uplink data transmissions.

There are two different cases for transmitting uplink control signaling and which of these two cases to use depends on whether the terminal (i.e., the mobile handset or UE) is simultaneously transmitting data in the uplink (along with the control information): (1) In case the terminal does not transmit data at the same time as control information, control signaling is transmitted on the Physical Uplink Control Channel (PUCCH) in the 4G networks. The radio resource to be used for control channel transmissions is either indicated by the downlink transmission (from the base station) or is semi-statically configured by the base station. (2) In case the terminal needs to simultaneously transmit uplink control information and data, control and data are multiplexed prior to transmission and transmitted on the Physical Uplink Shared Channel (PUSCH) in the 3G and 4G networks.

Thus, if a mobile terminal has been assigned an uplink resource for data transmission and, at the same time instance, if the terminal has control information to transmit as well, the terminal will transmit the control information together with the data on PUSCH. Thus, when PUSCH is transmitted, any control signaling is multiplexed with data to maintain single carrier structure. However, in the absence of PUSCH, control signaling is on the PUCCH. The control information—known as the Uplink Control Information (UCI)—can consist of one or more of the following: (i) ACK/NACK feedback for the downlink transmission from the base station corresponding to and preceding the uplink transmission (PUCCH or PUSCH) from the UE carrying the UCI; (ii) a Channel Quality Indicator (CQI) indicating channel quality of the wireless communication channel between the base station and the UE; (iii) a Precoding Matrix Indicator (PMI) indicating a preferred precoding matrix for the control signaling (PUCCH or PUSCH); and (iv) a Rank Indicator (RI) indicating the number of useful transmission layers for the control channel (PUCCH or PUSCH) as experienced by the UE. The CQI, PMI, and RI parameters may constitute Channel Status Information (CSI). The CQI/PMI/RI reports (i.e., CSI reports) can be periodic on PUCCH, but can be smaller and often non-frequency-selective. Whereas, CQI/PMI/RI reports can be aperiodic on PUSCH, but may be frequency-selective and larger (wideband or UE-selected sub-band). The CSI report (with or without PMI depending on the UE's configured transmission mode) from the UE may be triggered by 1 bit in a PDCCH message from the base station.

The general operations of the LTE physical channels are described in various Evolved Universal Terrestrial Radio Access (E-UTRA) specifications such as, for example, 3GPP's Technical Specifications (TS) 36.201 ("Physical Layer: General Description"), 36.211 ("Physical Channels and Modulation"), 36.212 ("Multiplexing and Channel Coding"), 36.213 ("Physical Layer Procedures"), 36.214 ("Physical Layer Measurements"), and 36.331 ("Radio Resource Control (RRC)-Protocol Specification"). These specifications may be consulted for additional reference and are incorporated herein by reference.

It is observed here that LTE Release-8 (Rel-8) now has been standardized to support operating bandwidths of up to 20 MHz. However, in order to meet International Mobile Telecommunications (IMT)-Advanced requirements, 3GPP has initiated work on LTE Release-10 (Rel-10) ("LTE Advanced") to support bandwidths larger than 20 MHz. One important requirement in LTE Rel-10 is to assure backward compatibility with LTE Rel-8. This includes spectrum compatibility, i.e., an LTE Rel-10 carrier, wider than 20 MHz, should appear as a number of (smaller) LTE carriers to an LTE Rel-8 terminal (i.e., mobile handset or UE). Each such smaller carrier can be referred to as a Component Carrier (CC). It is observed here that during initial deployments of LTE Rel-10, the number of LTE Rel-10-capable terminals may be smaller compared to many LTE legacy terminals (e.g., Rel-8 or Rel-9 terminals). Therefore, it is necessary to assure an efficient use of a wide (Rel-10) carrier also for legacy terminals. In other words, it should be possible to implement carriers where legacy terminals can be scheduled in all parts of the wideband LTE Rel-10 carrier. One way to obtain this efficient usage is by means of Carrier Aggregation (CA). CA implies that an LTE Rel-10 terminal can receive multiple CCs, where each CC has, or at least the possibility to have, the same structure as a Rel-8 carrier. FIG. 2 illustrates the principle of CC aggregation. As shown in FIG. 2, an operating bandwidth of 100 MHz (indicated by reference numeral "14") in Rel-10 may be constructed by the aggregation of five (contiguous, for simplicity) smaller bandwidths of 20 MHz (in compliance with Rel-8 requirements) as indicated by reference numerals "16" through "20". It is noted here that Rel-10 supports aggregation of up to five carriers, each with a bandwidth of up to 20 MHz. Thus, for example, if desired, carrier aggregation in Rel-10 also may be used to aggregate two carriers of 5 MHz bandwidth each. The carrier aggregation in uplink and downlink may thus support higher data rates than possible in legacy communication systems (i.e., UE's operating under 3GPP Rel-8, Rel-9, or below). UE's capable of operating only over a single Downlink/Uplink (DL/UL) pair may be referred to as "Legacy UE's", whereas UE's capable of operating over multiple DL/UL CCs may be referred to as "Advanced-UE's".

The number of aggregated CCs as well as the bandwidth of the individual CC may be different for uplink and downlink. A "symmetric configuration" refers to the case where the number of CCs in downlink and uplink is the same, whereas an "asymmetric configuration" refers to the case where the number of CCs is different in uplink and downlink. It is important to note that the number of CCs configured in the network may be different from the number of CCs "seen" by a terminal (or UE): A terminal may, for example, support more downlink CCs than uplink CCs, even though the network offers the same number of uplink and downlink CCs. The link between DL CCs and UL CCs can be UE-specific.

Scheduling of a CC (e.g., grant of radio resources for UL transmission from a UE on the CC) is done on the PDCCH via downlink assignments (from the base station). In Rel-8, a terminal only operates with one DL and one UL CC. Therefore, the association between DL assignment/UL grant and the corresponding DL and UL CCs is clear in Rel-8. However, in Rel-10, cross-carrier scheduling may be enabled where the PDCCH containing DL assignment/UL grant is transmitted on a CC that is different from the CC on which the Physical Downlink Shared Channel (PDSCH) or its associated PUSCH are transmitted.

SUMMARY

As mentioned above, the carrier aggregation (CA) approach may result in symmetric or asymmetric configurations of component carriers (CCs), and may also support cross-carrier scheduling. Thus, UCI on PUSCH with CA needs to handle the asymmetric allocation of UL/DL CCs. Furthermore, uplink control signaling in a CA environment should be able to handle multiplexing of ACK/NACK and potential CSI feedback for several DL component carriers onto a single UL component carrier. However, current 3GPP standards do not specify how this multiplexing of ACK/NACK and CSI feedback for several DL CCs should be done.

Furthermore, within the scope of carrier aggregation, it is also possible to have simultaneous transmissions of PUCCH for carrier aggregation (CA PUCCH) and PUSCH in the same subframe. Consequently, not all the UCI need to be mapped either to CA PUCCH or PUSCH. Further, it is also possible that some of the UCI information is transmitted on CA PUCCH on one component carrier while other part of the UCI information is transmitted on PUSCH on another component carrier. The different parts of UCI could be, for example, ACK/NACK transmission and CSI, however UCI information can be divided in other ways as well.

Therefore, depending on the configuration of number and types of UL CCs for a mobile handset or UE, it is desirable to devise a simple and robust scheme to instruct/inform the UE as to how (i.e., on what UL CC and on what physical channel (PUCCH or PUSCH)) the Uplink Control Information (UCI) from the UE is to be transmitted when carrier aggregation is present.

The present invention provides a solution to the above-mentioned need to specify (to the UE) how UCI on PUSCH should be transmitted with carrier aggregation. Particular embodiments of the present invention utilize a simple scheme to transmit UCI for different configurations of uplink CCs. A semi-static signaling of a UCI mapping bit is used to control a UE's transmission of UCI—by requiring the UE to use one of two UCI transmission modes. The bit can be decided by the base station (e.g., eNB), considering, for example, the available bandwidth or quality of different UL CCs associated with the UE.

In one embodiment, the present invention is directed to a method of controlling transmission of Uplink Control Information (UCI) by a User Equipment (UE) configured to be in wireless communication with a processor via a wireless network associated therewith. The method comprises the steps of: using the processor, providing radio signaling to the UE; and, using the processor, supplying a UCI mapping bit to the UE via the radio signaling so as to control UE's transmission of the UCI in accordance with a value of the UCI mapping bit.

In another embodiment, the present invention is directed to a method comprising the steps of: using a mobile handset, receiving a UCI mapping bit via radio signaling from a mobile communication node that is in wireless communication with the mobile handset through a wireless network associated therewith; and, using the mobile handset, transmitting UCI to the mobile communication node in accordance with a value of the UCI mapping bit.

In a further embodiment, the present invention is directed to a method of controlling transmission of UCI by a UE configured to be in wireless communication with a processor via a wireless network associated therewith. The method comprises the steps of: using the processor, monitoring reception quality of a signal transmitted on an Uplink Component Carrier (UL CC) associated with the UE; using the processor, determining a value of a UCI mapping bit based on the reception quality of the signal; and, using the processor, supplying the UCI mapping bit with the value to the UE so as to control UE's transmission of the UCI in accordance with the value of the UCI mapping bit.

In one embodiment, the present invention is directed to a mobile communication node configured to control transmission of UCI by a UE that is in wireless communication with the mobile communication node via a wireless network associated with the UE. The mobile communication node is configured to perform the following: provide Radio Resource Control (RRC) signaling to the UE; determine a value of a UCI mapping bit; and send the UCI mapping bit to the UE via the RRC signaling so as to control UE's transmission of the UCI in accordance with the value of the UCI mapping bit.

In another embodiment, the present invention is directed to a UE configured to perform the following: receive a UCI mapping bit via RRC signaling from a mobile communication node that is in wireless communication with the UE through a wireless network associated therewith; and transmit UCI to the mobile communication node in accordance with a value of the UCI mapping bit.

In a further embodiment, the present invention is directed to a system that comprises: a mobile handset configured to operate in a wireless network associated therewith; and a mobile communication node configured to provide a radio interface to the mobile handset in the wireless network. The mobile communication node is further configured to provide RRC signaling to the mobile handset, and determine a pair of values for a UCI mapping bit. The mobile communication node is also configured to send one of the following to the mobile handset via the RRC signaling so as to control the mobile handset's transmission of the UCI: the UCI mapping bit with a first value from the pair of values, thereby instructing the mobile handset to implement a first mode of UCI transmission; and the UCI mapping bit with a second value from the pair of values, thereby instructing the mobile handset to implement a second mode of UCI transmission. In the system, the mobile handset is further configured to perform the following: receive the UCI mapping bit from the mobile communication node via the RRC signaling, transmit the UCI using the first mode of UCI transmission when the UCI mapping bit is received with the first value, and transmit the UCI using the second mode of UCI transmission when the UCI mapping bit is received with the second value.

The teachings of the present invention thus enable a wireless communication network (e.g., a cellular network) to control the mode of operation for a UE's transmission of UCI for different configurations (symmetric or asymmetric) of uplink CCs, for simultaneous transmissions of CA PUCCH and PUSCH in the same subframe, and also for transmissions of parts of UCI on CA PUCCH and PUSCH over different CCs. A semi-static UCI mapping bit is used to control which UCI transmission mode must be used by the UE. The base station (e.g., the eNB) may explicitly or implicitly provide the UCI mapping bit to the UE (e.g., through the value of the "simultaneous PUCCH-PUSCH" RRC parameter). This allows the network to either configure a general rule of UCI transmission by the UE or to enforce the UCI transmission on the Uplink Primary Component Carrier (UL PCC) (the term "PCC" is interchangeably referred to hereinbelow as Primary cell or "Pcell") as discussed in more detail below.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that although the invention is described primarily in the context of a cellular telephone/data network, the teachings of this invention can be implemented in other forms of wireless networks as well (for example, a corporate-wide wireless data network, a satellite communication network, and the like).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "sub-frame") may be occasionally interchangeably used with its non-hyphenated version (e.g., "subframe"), a capitalized entry (e.g., "Uplink") may be interchangeably used with its non-capitalized version (e.g., "uplink"), and plural terms may be indicated with or without an apostrophe (e.g., CC's or CCs). Such occasional interchangeable uses shall not be considered inconsistent with each other.

It is noted at the outset that the terms "coupled," "connected", "connecting," "electrically connected," etc., are used interchangeably herein to generally refer to the condition of being electrically connected. Similarly, a first entity is considered to be in "communication" with a second entity (or entities) when the first entity electrically sends and/or receives (whether through wireline or wireless means) information signals (whether containing voice information or non-voice data/control information) to the second entity regardless of the type (analog or digital) of those signals. It is further noted that various figures (including component diagrams, graphs, or charts) shown and discussed herein are for illustrative purpose only, and are not drawn to scale.

Figure 3:
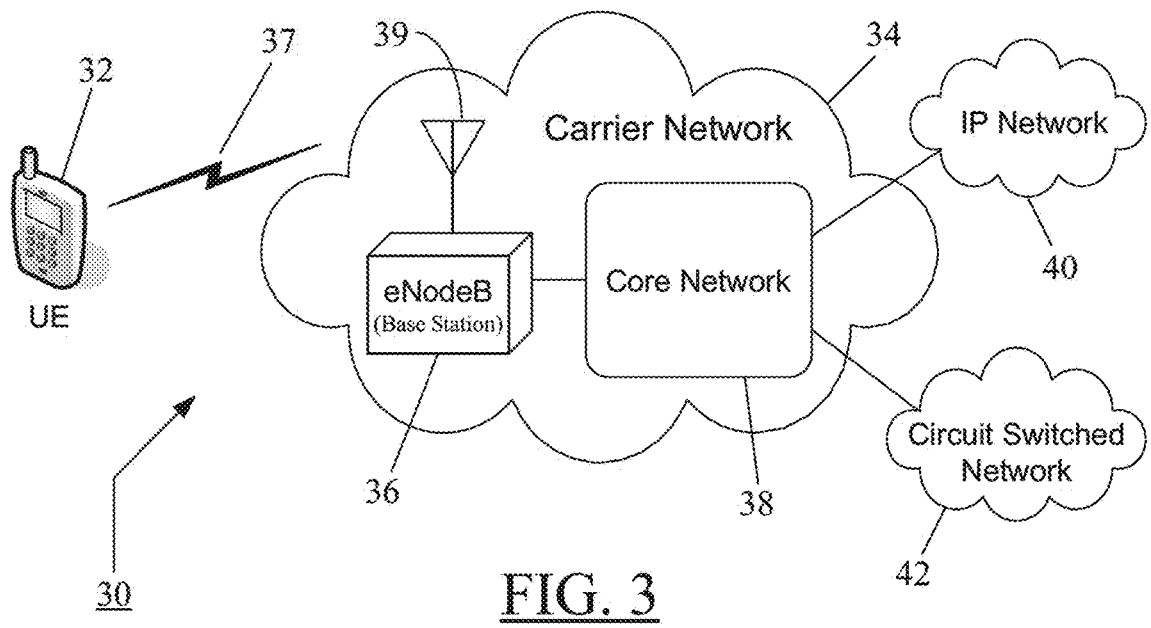
FIG. 3 is a diagram of an exemplary wireless system in which UCI transmission control according to the teachings of one embodiment of the present invention may be implemented.

FIG. 3 is a diagram of an exemplary wireless system 30 in which UCI transmission control according to the teachings of one embodiment of the present invention may be implemented. The system 30 may include a mobile handset 32 that is in wireless communication with a carrier network 34 of a wireless service provider through a communication node 36 of the carrier network 34. The communication node 36 may be, for example, an evolved Node-B (eNodeB or eNB) when the carrier network is a Long-Term Evolution (LTE) network, and may provide radio interface to the mobile handset 32. In other embodiments, the communication node 36 may also include a site controller, an access point (AP), or any other type of radio interface device capable of operating in a wireless environment. It is noted here that the terms "mobile handset," "wireless handset," "terminal," and "user equipment (UE)" may be used interchangeably herein to refer to a wireless communication device that is capable of voice and/or data communication via a wireless carrier network. Some examples of such mobile handsets include cellular telephones or data transfer equipments (e.g., a Personal Digital Assistant (PDA) or a pager), smartphones (e.g., iPhone™, Android™ Blackberry™, etc.), computers, or any other type of user devices capable of operating in a wireless environment. Similarly, the terms "wireless network" or "carrier network" may be used interchangeably herein to refer to a wireless communication network (e.g., a cellular network) facilitating voice and/or data communication between two user equipments (UE's).

In addition to providing air interface (e.g., as represented by a wireless link 37 in FIG. 3) to the UE 32 via an antenna 39, the communication node 36 may also perform radio resource management (as, for example, in case of an eNodeB in an LTE system) such as, for example, via Carrier Aggregation (CA) (e.g., aggregation of up to five carriers each having a bandwidth of up to 20 MHz) mentioned hereinbefore. Communication nodes in other types of carrier networks (e.g., 4G networks and beyond) also may be configured similarly. In one embodiment, the node 36 may be configured (in hardware, via software, or both) to implement the UCI transmission control as discussed herein. For example, when existing hardware architecture of the communication node 36 cannot be modified, the UCI transmission control methodology according to one embodiment of the present invention may be implemented through suitable programming of one or more processors (e.g., processor 66 (or, more particularly, processing unit 72) in FIG. 6) in the communication node 36. The execution of the program code (by a processor in the node 36) may cause the processor to perform UCI transmission control as discussed herein. Thus, in the discussion below, although the communication node 36 may be referred to as "performing," "accomplishing," or "carrying out" a function or process, it is evident to one skilled in the art that such performance may be technically accomplished in hardware and/or software as desired. Similarly, the UE 32 may be suitably configured (in hardware and/or software) to perform its portion of UCI transmission control as discussed in more detail hereinbelow.

The carrier network 34 may include a core network 38 coupled to the communication node 36 and providing logical and control functions (e.g., subscriber account management, billing, subscriber mobility management, etc.) in the network 38. In case of an LTE carrier network, the core network 38 may be an Access Gateway (AGW). Regardless of the type of carrier network 34, the core network 38 may function to provide connection of the UE 32 to other mobile handsets operating in the carrier network 34 and also to other communication devices (e.g., wireline phones) or resources (e.g., an Internet website) in other voice and/or data networks external to the carrier network 34. In that regard, the core network 38 may be coupled to a packet-switched network 40 (e.g., an Internet Protocol (IP) network such as the Internet) as well as a circuit-switched network 42 such as the Public-Switched Telephone Network (PSTN) to accomplish the desired connections beyond the devices operating in the carrier network 34. Thus, through the communication node's 36 connection to the core network 38 and the handset's 32 radio link with the communication node 36, a user of the handset 32 may wirelessly (and seamlessly) access many different resources or systems beyond those operating within the carrier network 34 of an operator.

As is understood, the carrier network 34 may be a cellular telephone network in which the UE 32 may be a subscriber unit. However, as mentioned before, the present invention is operable in other non-cellular wireless networks as well (whether voice networks, data networks, or both). Furthermore, portions of the carrier network 34 may include, independently or in combination, any of the present or future wireline or wireless communication networks such as, for example, the PSTN, or a satellite-based communication link. Similarly, as also mentioned above, the carrier network 34 may be connected to the Internet via its core network's 38 connection to the IP (packet-switched) network 40 or may include a portion of the Internet as part thereof.

Whether Carrier Aggregation (CA) is present or not, during initial access, an LTE Rel-10 terminal (or UE) may behave similar to an LTE Rel-8 terminal. Upon successful connection to the network, the terminal may—depending on its own capabilities and the network—be configured with additional CCs in the UL and DL. This configuration may be based on Radio Resource Control (RRC) signaling on higher layers. However, due to the heavy signaling and rather slow speed of RRC signaling, a terminal may be initially configured (e.g., by the eNB 36) with multiple CCs even though not all of them are currently used. As mentioned before, from a UE perspective, both symmetric and asymmetric uplink/downlink (UL/DL) CC configurations may be supported. Thus, on a slow basis, a terminal may be configured with a number of CCs in both UL and DL. However, if the terminal/UE 32 is configured on multiple CCs, the terminal may have to monitor all configured DL CCs for PDCCH and PDSCH. This may require a wider bandwidth, higher sampling rates, etc., which may result in high power consumption at the UE 32.

To mitigate above problems with configurations on multiple CCs, LTE Rel-10 also supports a faster mechanism that enables activation/de-activation of CCs (on top of the configuration of CCs mentioned above) by the eNB 36. The activated set of CCs will always be a subset of the configured set. The purpose behind activation/de-activation—which may be on a faster time scale than configuration—is to have a tool that enables rapid switching of CCs (e.g., by the eNB 36), thereby enabling the terminal (e.g., UE 32) to most of the time only monitor those CCs upon which the network (e.g., the network 34) intends to schedule that terminal. Thus, in one embodiment, the terminal or UE 32 monitors only configured and activated CCs for PDCCH and PDSCH. In one embodiment, activation may be based on Media Access Control (MAC) control elements, which may be faster than RRC signaling. The MAC-based activation/de-activation can follow the number of CCs that is required to fulfill the current data rate needs. Upon arrival of large data amounts, multiple CCs are activated (e.g., by eNB 36), used for data transmission, and de-activated if not needed anymore. All but a single pair of CCs— the DL Primary cell (DL Pcell) and the UL Primary cell (UL Pcell)—can be de-activated. Activation therefore provides the possibility to configure multiple CCs but only activate them on as-needed basis. Most of the time, a terminal or UE 32 would have one or very few CCs activated, resulting in a lower reception bandwidth and thus reduced battery consumption.

Figure 4:
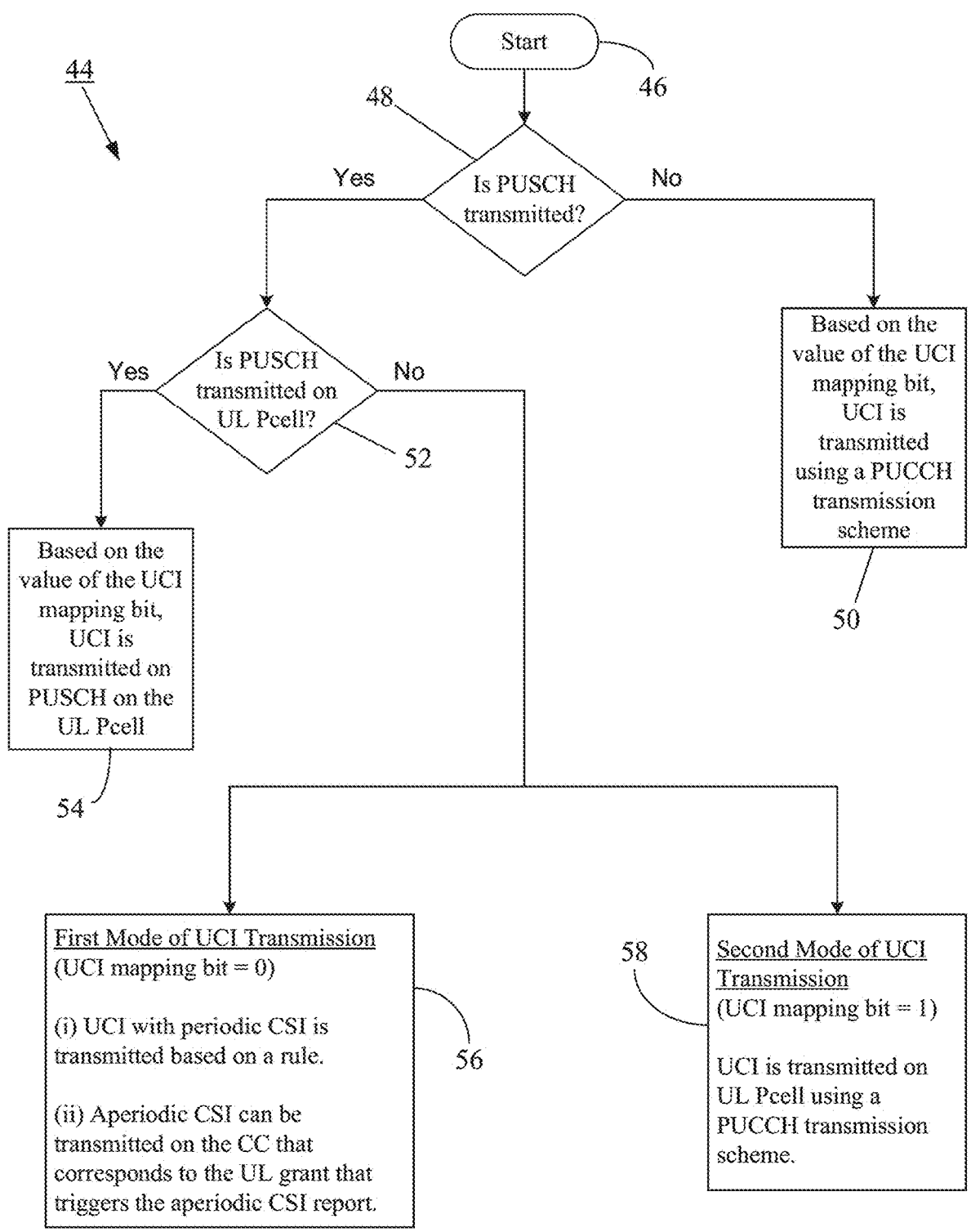
FIG. 4 is an exemplary flowchart depicting operations related to the two UCI transmission modes according to one embodiment of the present invention.

FIG. 4 is an exemplary flowchart 44 depicting operations related to the two UCI transmission modes according to one embodiment of the present invention. In one embodiment, the eNB 36 uses radio signaling (e.g., RRC signaling) between the eNB 36 and the UE 32 to control the UE's UCI transmission. As is known, a mobile handset (e.g., the UE 32) can have at most one RRC connection with the base station (e.g., the eNB 36). The RRC protocol layer (not shown) exists in the UE 32 and the eNodeB 36, and it is part of the LTE air interface control plane. RRC signaling (by the eNB 36) may be used to accomplish many functions such as, for example, broadcast of System Information (SI); establishment, maintenance, and release of an RRC connection between the UE 32 and the eNB 36; establishment, configuration, maintenance, and release of point-to-point Radio Bearer channels between the UE 32 and the eNB 36; and Quality of Service (QoS) management functions. In one embodiment, the eNB 36 informs the UE 32, through a UCI mapping bit in RRC signaling (which goes from the eNB 36 to the UE 32 via the RRC protocol), which of the below-described two UCI mapping modes of operation (i.e., UCI transmission modes) to use to transmit UCI to the eNB 36. The eNB 36 may implicitly provide the UCI mapping bit through the value of the RRC signaling parameter "simultaneous PUCCH-PUSCH" (defined in LTE Rel-10), which has the values of "true" or "false." If this parameter is not present in the RRC message, it has the value of "false", else it has the value of "true." Thus, for example, the UCI mapping bit is "1" or "true" if the RRC parameter "simultaneous PUCCH-PUSCH" is "true", and the UCI mapping bit is "0" or "false" if the RRC parameter "simultaneous PUCCH-PUSCH" is "false." Thus, through the semi-static signaling of the UCI mapping bit (whose value may be set by the eNB 36 as discussed herein), the eNB 36 can control the UE's transmission of UCI in accordance with the value of the UCI mapping bit. In other words, the value of the UCI mapping bit may configure the UE 32 (e.g., with the help of appropriate hardware/software residing in the UE 32) to operate according to the flowchart 44.

It is noted here that the discussion below addresses UCI transmission in the context of carrier aggregation (CA). Thus, in one embodiment, the UCI mapping bit is provided by eNB 36 (to the UE 32) when CA is present. Furthermore, in the below discussion of two UCI transmission modes, unless specified otherwise, references to a Component Carrier (CC) or a Primary cell (Pcell) "associated with" the UE 32 relate to a CC or CCs that are configured and activated (e.g., by the eNB 36) for the UE 32—i.e., CC or CCs on which the UE is scheduled to transmit. Also, unless specified otherwise, in the discussion below, the term "UCI" may include one or more of the following: ACK/NACK feedback information, CQI, PMI, and RI. As mentioned earlier, the CQI, PMI, and RI parameters may constitute CSI (Channel Status Information). CSI reports from the UE may be reported periodically (periodic CSI) or triggered aperiodically (aperiodic CSI). It is understood that periodic CSI is the CSI that is configured to be reported periodically, wherein the periodicity is configured by the eNB for the UE. On the other hand, aperiodic CSI is the CSI that is triggered by the eNB for the UE through the setting of a bit in the UL scheduling grant message (e.g., the Downlink Control Information (DCI) message).

Figure 1:
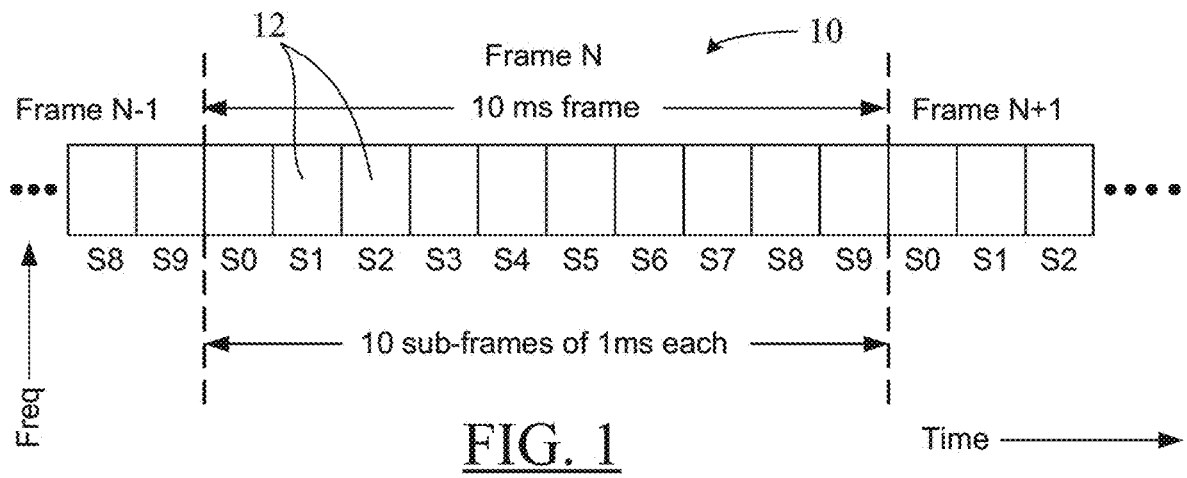
FIG. 1 illustrates an LTE radio frame in a sequence of radio frames that may constitute the communication "link" between a base station and a mobile handset in a cellular network.
Figure 2:
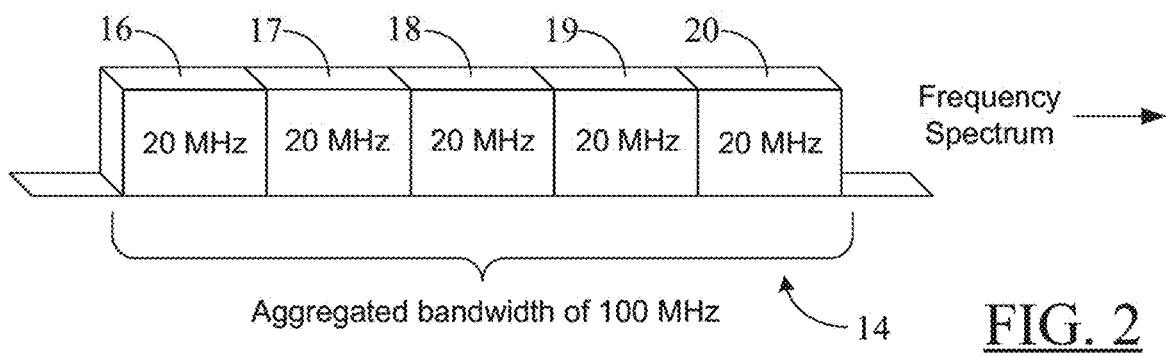
FIG. 2 illustrates the principle of Component Carrier (CC) aggregation.

The UE 32 may be required (or configured (e.g., in hardware and/or software as mentioned earlier)) to follow the first pre-determined mode of UCI transmission when the received UCI mapping bit (from the eNB 36) has a first distinct value. This first value may be a "0", or "off", or any other logical value (binary or non-binary) that is different from the second value discussed below with reference to the second pre-determined mode of UCI transmission. In the first mode of UCI transmission (after the "Start" block 46 in FIG. 4 and when UCI mapping bit=0, for example), the UE 32 may transmit UCI as follows, depending on whether a PUSCH is to be transmitted (by the UE 32) in the current subframe (e.g., a subframe 12 in an LTE radio frame 10 discussed earlier with reference to FIG. 1). The term "current subframe" herein refers to a UL subframe that is currently being transmitted from the UE 32 to the eNB 36.

(I-A) If no PUSCH is transmitted on any UL CC (associated with the UE 32) in the current subframe, the UCI (including any or a combination of ACK/NACK information, aperiodic CSI, and/or periodic CSI) may be transmitted on the UL Pcell (for the UE 32) in the current subframe using the PUCCH transmission scheme for carrier aggregation or the PUCCH transmission scheme for LTE Rel-8/9 (blocks 48 and 50 in FIG. 4). In one embodiment, the PUCCH transmission scheme for carrier aggregation may be based on Discrete Fourier Transform Spread Orthogonal Frequency Division Multiplexing (DFTS OFDM) and may include a CA PUCCH format in LTE Rel-10 (e.g., PUCCH format 3), or may be another LTE Rel-10 CA PUCCH format associated with a channel selection-based HARQ feedback scheme (e.g., PUCCH format 1b with channel selection). It is noted here that when the UE is configured with carrier aggregation, the CA PUCCH format is essentially the PUCCH format that provides ACK/NACK feedback for PDSCH transmissions on multiple DL carriers. The PUCCH transmission scheme for LTE Rel-8/9 may include one of a number of PUCCH formats (e.g., PUCCH formats 1a/1b/2/2a/2b) supported in LTE Rel-8 or Rel-9. It is known that, in LTE Rel-8 and in Rel-9, PUCCH supports multiple formats such as format 1a, 1b, 2, 2a, 2b, and a mix of formats 1a/1b and 2/2a/2b. These PUCCH formats are used in the following manner PUCCH format 1a uses a 1-bit ACK/NACK, PUCCH format 1b uses a 2-bit ACK/NACK, PUCCH format 2 uses periodic CQI, PUCCH format 2a uses periodic CQI with 1-bit ACK/NACK, and PUCCH format 2b uses periodic CQI with 2-bit ACK/NACK.

(I-B) If PUSCH is transmitted on the UE-specific UL Pcell in the current subframe, then the UCI (including any or a combination of ACK/NACK information, aperiodic CSI, and/or periodic CSI) also may be transmitted on that UL Pcell in the current subframe using the PUSCH (blocks 48, 52, and 54 in FIG. 4).

(I-C) If PUSCH is transmitted in the current subframe on any other UL CC associated with the UE 32 (e.g., any UL secondary CC or Secondary cell (Scell) associated with the UE 32) except the UL Pcell, then the UE 32 may follow the following two options (blocks 48, 52, and 56 in FIG. 4):

(a) UCI (including any or a combination of ACK/NACK information and/or periodic CSI, but excluding aperiodic CSI) may be transmitted based on an appropriate rule. In one embodiment, the rule may be stored in the UE 32 (e.g., in a memory (such as memory 64 in FIG. 5) in the UE 32) by UE's manufacturer or may be signaled to the UE 32 by the operator of the carrier network 34 (e.g., through wireless communication between the UE 32 and the eNB 36). An exemplary rule may require UE 32 to transmit UCI (excluding aperiodic CSI) in the current subframe using PUSCH on an UL CC (except the UL Pcell as mentioned above) having the widest bandwidth among all UL CCs associated with the UE 32. Any other suitable rule may be devised as well.

(b) UCI containing aperiodic CSI can be transmitted in the current subframe using PUSCH on an UL CC (except the UL Pcell as mentioned above) which corresponds to a DL CC for the UL grant that triggers reporting of the aperiodic CSI (e.g., to the eNB 36). Such reporting may be triggered by 1 bit in a PDCCH message (from the base station or eNB 36) on that DL CC.

Similarly, the UE 32 may be required (or configured (e.g., in hardware and/or software as mentioned earlier)) to follow the second mode of UCI transmission when the received UCI mapping bit (from the eNB 36) has a second distinct value. This second value may be a "1", or "on", or any other logical value (binary or non-binary) that is different from the first value discussed above with reference to the first mode of UCI transmission. In the second mode of UCI transmission (after the "Start" block 46 in FIG. 4 and when UCI mapping bit=1, for example), the UE 32 may transmit UCI as follows, again depending on whether a PUSCH is to be transmitted (by the UE 32) in the current subframe.

(II-A) If no PUSCH is transmitted on any UL CC (associated with the UE 32) in the current subframe, the UCI (including any or a combination of ACK/NACK information, aperiodic CSI, and/or periodic CSI) may be transmitted on the UL Pcell (for the UE 32) in the current subframe using the PUCCH transmission scheme for carrier aggregation or the PUCCH transmission scheme for LTE Rel-8/9 (blocks 48 and 50 in FIG. 4). Because earlier discussion of various PUCCH transmission schemes and related PUCCH formats in sub-paragraph (I-A) applies here as well, such discussion is not repeated herein for the sake of brevity. It is however noted that a PUCCH format used for UCI transmission under this sub-paragraph (II-A) may be the same as or different from the PUCCH format used for UCI transmission under sub-paragraph (I-A) discussed above.

(II-B) If PUSCH is transmitted on the UE-specific UL Pcell in the current subframe, then the UCI (including any or a combination of ACK/NACK information, aperiodic CSI, and/or periodic CSI) also may be transmitted on that UL Pcell in the current subframe using the PUSCH (blocks 48, 52, and 54 in FIG. 4). It is noted that UCI transmission under this sub-paragraph (II-B) may be the same as or different from the UCI transmission under sub-paragraph (I-B) discussed above.

(II-C) If PUSCH is transmitted in the current subframe on any other UL CC associated with the UE 32 (e.g., any UL Scell associated with the UE 32) except the UL Pcell, then the UCI (including any or a combination of ACK/NACK information or and/or periodic CSI) may be transmitted on the UL Pcell (for the UE 32) in the current subframe using the PUCCH transmission scheme for carrier aggregation or the PUCCH transmission scheme for LTE Rel-8/9 (blocks 48, 52, and 58 in FIG. 4). The aperiodic CSI may be transmitted in the current subframe on a UL CC (except UL Pcell) using PUSCH. Because earlier discussion of various PUCCH transmission schemes and related PUCCH formats in sub-paragraph (I-A) applies here as well, such discussion is not repeated herein for the sake of brevity. It is however noted that a PUCCH format used for UCI transmission under this sub-paragraph (II-C) may be the same as or different from the PUCCH format used for UCI transmission under sub-paragraphs (I-A) or (II-A) discussed above.

It is observed from FIG. 4 and above discussion of both modes of UCI transmission that, in one embodiment, both mode differ when there is PUSCH transmission on a UL CC, but not on the UL Pcell. In that case, UCI is either transmitted on PUSCH on a given component carrier according to a rule (under first mode of UCI transmission), or UCI is forced to be transmitted on PUCCH on the UL Pcell (under second mode of UCI transmission). In one embodiment, the eNB 36 may monitor reception quality of a signal (e.g., a Reference Signal (RS) on PUSCH, or a PUSCH, or a Sounding Reference Signal (SRS)) transmitted on a UL CC (including UL Pcell) associated with the UE 32, and may determine the value of the UCI mapping bit based on the reception quality of this signal. For example, the eNB 36 may set the value of the UCI mapping bit equal to "1" (or any other value that triggers the second mode of UCI transmission) when the reception quality on the UL CC according to the first mode of UCI transmission (under any of the sub-paragraphs (I-A), (I-B), or (I-C) above) is not above an eNB implementation-specific threshold. Thus, eNB 36 may initially set the value of the UCI mapping bit, or re-configure the value of the UCI mapping bit and switch from the first mode to the second mode of UCI transmission, based on the quality of signaling on the UL CCs associated with the UE 32.

In another embodiment, the eNB 36 may determine the value of the UCI mapping bit based on a comparison of available bandwidths of all UL CCs associated with the UE 32. Such comparison allows the network (e.g., through the eNB 36 in the carrier network 34) to either configure an exemplary rule when a UL CC with wide bandwidth is available (as discussed under sub-paragraph (I-C)(a) in case of the first mode of UCI transmission) or to enforce the UCI transmission on the UL Pcell (as under sub-paragraph (II-C) in case of the second mode of UCI transmission). Thus, through transmission of appropriate value for the UCI mapping bit, the network 34 (through eNB 36) may control UE's 32 transmission of UCI as desired.

The UCI mapping bit-based UCI transmission control discussed above may be applicable to cases where part of the UCI is configured (e.g., by the UE 32 with/without instructions from the eNB 36) to be transmitted on PUCCH (e.g., a CA PUCCH under LTE Rel-10) and another part of the UCI is configured to be transmitted on PUSCH in the same subframe as mentioned under the "Summary" section earlier. The different parts of UCI could be, for example, ACK/NACK transmission and CSI, however UCI information can be divided in other ways as well. Such simultaneous transmission of CA PUCCH on one component carrier and PUSCH on another component carrier in the same subframe may be possible, for example, in the first mode of UCI transmission as discussed under sub-paragraph (I-C) above or in the second mode of UCI transmission as discussed under sub-paragraph (II-C) above. As another example, such simultaneous transmission of CA PUCCH on one component carrier and PUSCH on another component carrier in the same subframe may be possible using the second mode of UCI transmission as discussed under sub-paragraph (I-B) above and the second mode of UCI transmission as discussed under sub-paragraph (II-B) above.

Figure 5:
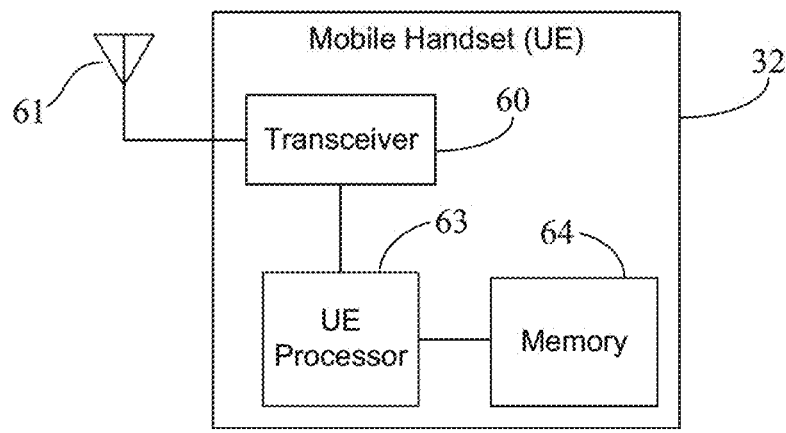
FIG. 5 is a block diagram of an exemplary mobile handset or UE according to one embodiment of the present invention.

FIG. 5 is a block diagram of an exemplary mobile handset or UE 32 according to one embodiment of the present invention. The UE 32 may include a transceiver 60, an antenna 61, a processor 63, and a memory 64. In particular embodiments, some or all of the functionalities described above (e.g., reception of UCI mapping bit from the eNB 36 via the antenna 61 and transceiver 60; storage of the value of the UCI mapping bit in the memory 64; selection of one of the two modes of UCI transmission as per the value of the UCI mapping bit; transmission of UCI to eNB 36 as per the selected UCI transmission mode via transceiver 60 and antenna 61; etc.) as being provided by mobile communication devices or other forms of UE may be provided by the UE processor 63 executing instructions stored on a computer-readable medium, such as the memory 64 shown in FIG. 5. Alternative embodiments of the UE 32 may include additional components beyond those shown in FIG. 5 that may be responsible for providing certain aspects of the UE's functionality, including any of the functionality described above and/or any functionality necessary to support the solution described above (e.g., operations shown and discussed with reference to the flowchart 44 in FIG. 4).

Figure 6:
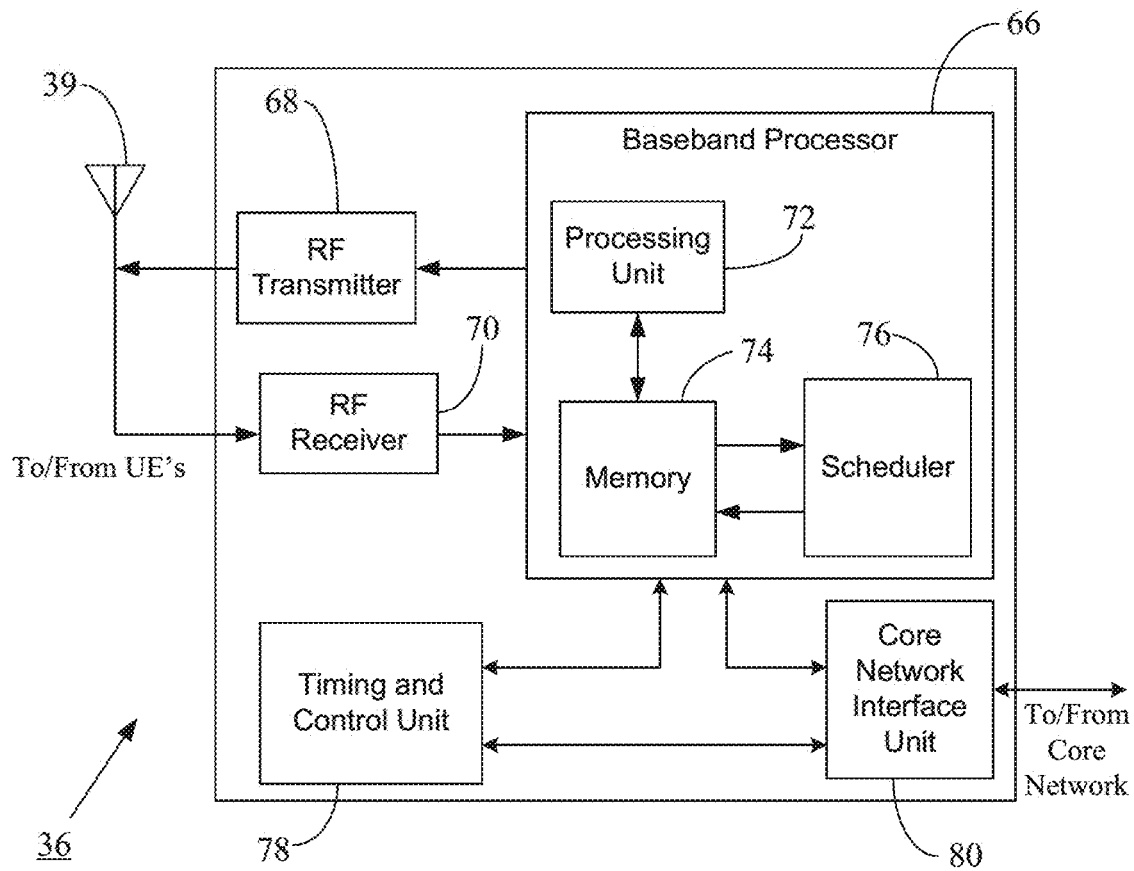
FIG. 6 is a block diagram of an exemplary eNodeB according to one embodiment of the present invention.

FIG. 6 is a block diagram of an exemplary eNodeB (or a similar communication node) 36 according to one embodiment of the present invention. The eNodeB 36 may include a baseband processor 66 to provide radio interface with the mobile handsets (in the carrier network 34) via eNodeB's Radio Frequency (RF) transmitter 68 and RF receiver 70 units coupled to the eNodeB antenna 39. The processor 66 may be configured (in hardware and/or software) to determine a value of a UCI mapping bit and to supply the UCI mapping bit to the UE 32 via appropriate downlink signals (e.g., RRC signaling) to control UE's 32 transmission of UCI as per the teachings of the present invention. In one embodiment, the processor 66 may also supply any specific rule of UCI transmission under the first mode of UCI transmission discussed hereinbefore or may specify any specific PUCCH transmission scheme for the UE 32 to use during UCI transmission under either of the above-described two modes. In the context of FIG. 6, the transmissions from the UE 32 may be received at the receiver 70, whereas eNB's transmissions to the UE 32 may be carried out via the transmitter 68. The baseband processor 66 may include a processing unit 72 in communication with a memory 74 to provide, for example, a UCI mapping bit to the UE 32 as per the teachings of the present invention. A scheduler (e.g., the scheduler 76 in FIG. 6) in the eNB 36 may provide the scheduling decision for UE 32 based on a number of factors such as, for example, QoS (Quality of Service) parameters, UE buffer status, uplink channel quality report received from UE 32, UE capabilities, etc. The scheduler 76 may have the same data structure as a typical scheduler in an eNB in an LTE system.

The processor 66 may also provide additional baseband signal processing (e.g., mobile device registration, channel signal information transmission, radio resource management, etc.) as required. The processing unit 72 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above as being provided by a mobile base station, a base station controller, a node B, an enhanced node B, a pico/femto base station, and/or any other type of mobile communications node may be provided by the processing unit 72 executing instructions stored on a computer-readable data storage medium, such as the memory 74 shown in FIG. 6.

The eNodeB 36 may further include a timing and control unit 78 and a core network interface unit 80 as illustrated in FIG. 6. The control unit 78 may monitor operations of the processor 66 and the network interface unit 80, and may provide appropriate timing and control signals to these units. The interface unit 80 may provide a bi-directional interface for the eNodeB 36 to communicate with the core network 38 to facilitate administrative and call-management functions for mobile subscribers operating in the carrier network 34 through eNodeB 36.

Alternative embodiments of the base station 36 may include additional components responsible for providing additional functionality, including any of the functionality identified above and/or any functionality necessary to support the solution described above (e.g., operations shown and discussed with reference to the flowchart 44 in FIG. 4). Although features and elements are described above in particular combinations, each feature or element can be used alone without the other features and elements or in various combinations with or without other features and elements. The methodology provided herein (related to the supply of a UCI mapping bit to a UE 32 and control of UE's UCI transmission in accordance with the value of the UCI mapping bit) may be implemented in a computer program, software, or firmware incorporated in a computer-readable storage medium (e.g., the memory 64 in FIG. 5 and memory 74 in FIG. 6) for execution by a general purpose computer or a processor (e.g., the processor 63 in FIG. 5 and processing unit 72 in FIG. 6). Examples of computer-readable storage media include a Read Only Memory (ROM), a Random Access Memory (RAM), a digital register, a cache memory, semiconductor memory devices or structures, magnetic media such as internal hard disks, magnetic tapes and removable disks, magneto-optical media, and optical media such as CD-ROM disks and Digital Versatile Disks (DVDs).

The foregoing describes a system and method to instruct a UE how UCI on PUSCH should be transmitted with carrier aggregation. A semi-static signaling of a UCI mapping bit (via RRC parameter known as "simultaneous PUCCH-PUSCH") is used by a base station to require the UE to transmit UCI using one of two pre-determined UCI transmission modes. The value of the bit can be decided by the base station (e.g., eNB), considering, for example, the available bandwidth or quality of different UL CCs associated with the UE. Thus, a wireless communication network (e.g., a cellular network) can control the UE's transmission of UCI for different configurations (symmetric or asymmetric) of uplink CCs, for simultaneous transmissions of CA PUCCH and PUSCH in the same subframe, and also for transmissions of parts of UCI on CA PUCCH and PUSCH over different CCs. This network-based solution allows the network to either configure a general rule of UCI transmission by the UE or to enforce the UCI transmission on the Uplink Primary Component Carrier (UL PCC or UL Pcell).

It is noted here that the teachings of the present invention related to the network-based control of UE's UCI transmissions may be applied, with suitable modifications (as may be apparent to one skilled in the art using the present teachings), to other wireless systems as well—e.g., Worldwide Interoperability for Microwave Access (WiMAX) systems.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A user equipment (UE) for communication in a cellular network, the UE comprising:
   a memory storing executable instructions; and
   a processor configured to execute the instructions to perform operations comprising:
      receiving information indicating a value of an Uplink Control Information (UCI) mapping bit via radio signaling from a base station; and
      in response to a determination that a physical uplink shared channel (PUSCH) is to be transmitted during a current subframe on an Uplink Secondary cell (UL Scell) and not on an Uplink Primary cell (UL Pcell), transmitting UCI to the base station using a first mode of UCI transmission or a second mode of UCI transmission in accordance with the value of the UCI mapping bit wherein the first mode of UCI transmission comprises transmitting the UCI on the PUSCH and the second mode of UCI transmission comprises transmitting the UCI on a physical uplink control channel (PUCCH).

2. The UE of claim 1, wherein the first mode of transmission comprises transmitting the UCI with periodic CSI contained therein in the current subframe using the PUSCH on a UL CC associated with the user equipment and having a widest bandwidth among all UL CCs associated with the user equipment.

3. The UE of claim 1, wherein the UCI includes at least one of:
   Acknowledge/Negative Acknowledge (ACK/NACK) feedback information;
   a Channel Quality Indicator (CQI);
   a Precoding Matrix Indicator (PMI); or
   a Rank Indicator (RI).

4. A method performable by a base station for controlling transmission of Uplink Control Information (UCI) by a user equipment (UE), the method comprising:
   providing radio signaling to the UE; and
   supplying a UCI mapping bit to the UE via the radio signaling, the UCI mapping bit corresponding to a value of a signaling parameter that indicates whether simultaneous physical uplink control channel (PUCCH) and physical uplink shared channel (PUSCH) transmissions is configured for the user equipment, the UCI mapping bit indicating to the UE:
      a first mode of UCI transmission when the value of the signaling parameter is a first value, the first mode comprising transmitting the UCI on the PUSCH, and
      a second mode of UCI transmission when the value of the signaling parameter is a second value that is different than the first value, the second mode comprising transmitting the UCI on the PUCCH; and
   receiving UCI from the UE, responsive to the UE determining that a PUSCH transmission is to be transmitted, using the first mode or the second mode, during a current subframe on an Uplink Secondary cell (UL Scell) and not on an Uplink Primary cell (UL Pcell).

5. The method of claim 4, wherein the radio signaling is Radio Resource Control (RRC) signaling.

6. The method of claim 5, wherein the UCI mapping bit is supplied to the UE via an RRC signaling parameter referred to as "simultaneous Physical Uplink Control Channel (PUCCH)-Physical Uplink Shared Channel (PUSCH)".

7. The method of claim 4, wherein the UCI mapping bit is used with Carrier Aggregation (CA), and wherein one of the following applies:
   in an absence of transmission of a Physical Uplink Shared Channel (PUSCH) from the UE in a current subframe on any Uplink Component Carrier (UL CC) associated with the UE, the value of the UCI mapping bit instructs the UE to transmit the UCI in the current subframe using a first Physical Uplink Control Channel (PUCCH) transmission scheme, wherein the value of the UCI mapping bit is either a first value or a second value that is different from the first value;
   in case of transmission of the PUSCH from the UE on an Uplink Primary Cell (UL Pcell) in the current subframe, the value of the UCI mapping bit instructs the UE to transmit the UCI in the current subframe using the PUSCH, wherein the value of the UCI mapping bit is either the first value or the second value;
   when the value of the UCI mapping bit is the first value and in case of transmission of the PUSCH from the UE in the current subframe on any UL CC associated with the UE except the UL Pcell, the following applies:
      the first value of the UCI mapping bit instructs the UE to transmit the UCI excluding aperiodic Channel Status Information (CSI) contained therein in the current subframe using the PUSCH based on a pre-determined rule, and
      the first value of the UCI mapping bit instructs the UE to transmit the UCI containing at least the aperiodic CSI in the current subframe using the PUSCH; and
   when the value of the UCI mapping bit is the second value and in case of transmission of the PUSCH from the UE in the current subframe on any UL CC associated with the UE except the UL Pcell, the second value of the UCI mapping bit instructs the UE to transmit the UCI in the current subframe using a second PUCCH transmission scheme.

8. The method of claim 7, wherein the pre-determined rule requires the UE to transmit the UCI excluding the aperiodic CSI in the current subframe using the PUSCH on a UL CC associated with the UE and having the widest bandwidth among all UL CCs associated with the UE.

9. The method of claim 7, wherein each of the first and the second PUCCH transmission schemes is one of the following:
   a PUCCH transmission scheme for CA;
   a PUCCH transmission scheme for Long Term Evolution (LTE) Release-8; or
   a PUCCH transmission scheme for LTE Release-9.

10. The method of claim 7, wherein:
   in the absence of transmission of the PUSCH from the UE in the current subframe on any UL CC associated with the UE, the value of the UCI mapping bit instructs the UE to transmit the UCI on the UL Pcell for the UE in the current subframe using the first PUCCH transmission scheme;
   in case of the transmission of the PUSCH from the UE on the UL Pcell in the current subframe, the value of the UCI mapping bit instructs the UE to transmit the UCI on the UL Pcell in the current subframe using the PUSCH;

when the value of the UCI mapping bit is the first value and in case of transmission of the PUSCH from the UE in the current subframe on any UL CC associated with the UE except the UL Pcell, the first value of the UCI mapping bit instructs the UE to transmit the UCI containing at least the aperiodic CSI on a corresponding UL CC in the current subframe using the PUSCH, wherein the corresponding UL CC is associated with the UE and corresponds to a Downlink Component Carrier (DL CC) that triggers reporting of the aperiodic CSI; or when the value of the UCI mapping bit is the second value and in case of transmission of the PUSCH from the UE in the current subframe on any UL CC associated with the UE except the UL Pcell, the second value of the UCI mapping bit instructs the UE to transmit the UCI on the UL Pcell for the UE in the current subframe using the second PUCCH transmission scheme.

11. The method of claim 4, wherein the UCI mapping bit is used with Carrier Aggregation (CA), and wherein supplying the UCI mapping bit comprises:

supplying a first value for the UCI mapping bit to instruct the UE to implement a first mode of UCI transmission; or supplying a second value for the UCI mapping bit to instruct the UE to implement a second mode of UCI transmission, wherein the second value is different from the first value.

12. The method of claim 4, wherein the UCI mapping bit is used with Carrier Aggregation (CA), and wherein the method further comprises:

monitoring reception quality of a signal transmitted on an Uplink Component Carrier (UL CC) associated with the UE; and determining the value of the UCI mapping bit based on the reception quality of the signal or based on a comparison of available bandwidths of all Uplink Component Carriers (UL CCs) associated with the UE.

13. The method of claim 4, wherein the UCI mapping bit is used with Carrier Aggregation (CA), and wherein the method further comprises:

determining the value of the UCI mapping bit based on a comparison of available bandwidths of all Uplink Component Carriers (UL CCs) associated with the UE.

14. A method performable by a base station for controlling transmission of Uplink Control Information (UCI) by a user equipment (UE) configured for wireless communication, the method comprising:

monitoring reception quality of a signal transmitted on an Uplink Component Carrier (UL CC) associated with the UE;

determining a value of a UCI mapping bit based on the reception quality of the signal; and supplying the UCI mapping bit with the value to the UE, the UCI mapping bit corresponding to a value of a signaling parameter that indicates whether simultaneous physical uplink control channel (PUCCH) and physical uplink shared channel (PUSCH) transmissions is configured for the user equipment, the UCI mapping bit indicating to the UE:

a first mode of UCI transmission when the value of the signaling parameter is a first value, the first mode comprising transmitting the UCI on the PUSCH, and a second mode of UCI transmission when the value of the signaling parameter is a second value that is different than the first value, the second mode comprising transmitting the UCI on the PUCCH; and receiving UCI from the UE, responsive to the UE determining that a PUSCH transmission is to be transmitted, using the first mode or the second mode, during a current subframe on an Uplink Secondary cell (UL Scell) and not on an Uplink Primary cell (UL Pcell).

* * * * *